(12) United States Patent
Tsai et al.

(10) Patent No.: US 9,131,301 B2
(45) Date of Patent: Sep. 8, 2015

(54) SPEAKER ENCLOSURE AND METHOD FOR FABRICATING THE SAME

(71) Applicants: Usher Audio Technology, Taipei (TW); OS-Tech Precision Corporation, Taoyuan County (TW)

(72) Inventors: Lien-Shui Tsai, Taipei (TW); Heng-Tzu Tseng, Taoyuan County (TW); Chao-Liang Yin, Taoyuan County (TW)

(73) Assignees: USHER AUDIO TECHNOLOGY, Taipei (TW); OS-TECH PRECISION CORPORATION, Taoyuan County (TW)

( * ) Notice: Subject to any disclaimer, the term of this patent is extended or adjusted under 35 U.S.C. 154(b) by 0 days.

(21) Appl. No.: 14/445,721

(22) Filed: Jul. 29, 2014

(65) Prior Publication Data
US 2015/0027805 A1 Jan. 29, 2015

(30) Foreign Application Priority Data
Jul. 29, 2013 (TW) .............................. 102127125 A

(51) Int. Cl.
*H05K 5/02* (2006.01)
*H04R 1/28* (2006.01)
*H04R 1/22* (2006.01)
*H04R 1/02* (2006.01)
*B29D 22/00* (2006.01)
*H05K 5/00* (2006.01)
(Continued)

(52) U.S. Cl.
CPC ................ *H04R 1/02* (2013.01); *B29D 22/003* (2013.01); *B29L 2031/712* (2013.01)

(58) Field of Classification Search
CPC ......... H05K 5/00; H05K 5/02; H05K 5/0217; H04R 1/00; H04R 1/02; H04R 1/20; H04R 1/22; H04R 1/28; H04R 1/227; H04R 1/2803; H04R 1/2869; H04R 1/2873; H04R 1/2876; H04R 1/288; H04R 1/2884; H04R 1/2888; H04R 1/2846
USPC .......... 181/199, 146, 151, 155; 381/345, 352, 381/353, 354, 160
See application file for complete search history.

(56) References Cited

U.S. PATENT DOCUMENTS 1,975,201 A * 10/1934 Elworthy ....................... 181/155
2,491,982 A * 12/1949 Kincart ......................... 181/156
3,834,485 A * 9/1974 Doschek et al. .............. 181/146
(Continued)

FOREIGN PATENT DOCUMENTS

DE 3248340 A1 * 12/1983 ............... H04R 1/02
GB 2277008 A * 10/1994 ............... H04R 1/28
(Continued)

*Primary Examiner* — Edgardo San Martin
(74) *Attorney, Agent, or Firm* — Bacon & Thomas, PLLC

(57) ABSTRACT

The invention relates to a speaker enclosure and a method for fabricating the same. The speaker enclosure comprises a main housing, a top cover, and a bottom plate. The main housing fabricated by a molding process and having a continuous side wall, end faces, and an inner space, wherein, a plurality of ribs are formed on the inner surface of the continuous side wall, so that the inner surface is an irregular surface. Therefore, the reflected direction of sound waves generated by a speaker unit in the inner space will be changed and the amplitude of sound waves will be decreased by an irregular surface formed in the inner surface of the continuous side wall. As the result, standing waves and echoes mixing with original sound waves may be eliminated.

18 Claims, 11 Drawing Sheets

(51) Int. Cl.
*H04R 1/20* (2006.01)
*B29L 31/00* (2006.01)

(56) References Cited

U.S. PATENT DOCUMENTS

| | | | |
|---|---|---|---|
| 3,953,675 A * | 4/1976 | Babb | 381/353 |
| 4,109,983 A * | 8/1978 | Kinoshita | 312/7.1 |
| 4,168,762 A * | 9/1979 | Griffin, Jr. | 181/163 |
| 4,424,881 A * | 1/1984 | Hattori | 181/155 |
| 4,750,585 A * | 6/1988 | Collings | 181/148 |
| 4,819,761 A * | 4/1989 | Dick | 181/145 |
| 4,869,340 A * | 9/1989 | Coudoux | 181/146 |
| 4,891,842 A * | 1/1990 | Green | 381/392 |
| 4,964,482 A * | 10/1990 | Meyer | 181/146 |
| 5,206,464 A * | 4/1993 | Lamm et al. | 181/150 |
| 5,218,176 A * | 6/1993 | Meyer, Jr. | 181/199 |
| 5,286,928 A * | 2/1994 | Borland | 181/153 |
| 5,661,271 A * | 8/1997 | Moser | 181/199 |
| 5,675,131 A * | 10/1997 | Saito et al. | 181/152 |
| 5,832,099 A * | 11/1998 | Wiener | 381/386 |
| 6,009,972 A * | 1/2000 | Choi et al. | 181/155 |
| 6,056,083 A * | 5/2000 | Daniell | 181/199 |
| 6,320,971 B1 * | 11/2001 | Tozawa | 381/386 |
| 6,324,292 B1 * | 11/2001 | Mitsuhashi et al. | 381/349 |
| 6,561,311 B2 * | 5/2003 | Chuang | 181/199 |
| 6,598,700 B1 * | 7/2003 | Schroeder | 181/199 |
| 6,675,932 B2 * | 1/2004 | Manrique et al. | 181/199 |
| 6,735,320 B1 * | 5/2004 | Gertner, Jr. | 381/349 |
| 6,763,117 B2 * | 7/2004 | Goldslager et al. | 381/345 |
| 6,859,543 B2 * | 2/2005 | Fingleton | 381/338 |
| 7,096,995 B2 * | 8/2006 | Cox et al. | 181/199 |
| RE39,330 E * | 10/2006 | Tozawa | 381/386 |
| 7,201,252 B2 * | 4/2007 | Nevill | 181/151 |
| 7,207,413 B2 * | 4/2007 | Plummer | 181/199 |
| 8,267,221 B2 * | 9/2012 | Chen | 181/199 |
| 8,356,689 B2 * | 1/2013 | Huang | 181/199 |
| 2005/0087392 A1 * | 4/2005 | Flanders et al. | 181/156 |
| 2008/0006477 A1 * | 1/2008 | Huang | 181/199 |

FOREIGN PATENT DOCUMENTS

| | | | | |
|---|---|---|---|---|
| GB | 2301727 A | * | 12/1996 | H04R 1/02 |
| JP | 57155893 A | * | 9/1982 | H04R 1/02 |
| JP | 59196692 A | * | 11/1984 | H04R 1/28 |

* cited by examiner

SPEAKER ENCLOSURE AND METHOD FOR FABRICATING THE SAME

CROSS REFERENCE TO RELATED APPLICATION

This application claims the benefits of the Taiwan Patent Application Serial Number 102127125, filed on Jul. 29, 2013, the subject matter of which is incorporated herein by reference.

BACKGROUND OF THE INVENTION

1. Field of the Invention

The present invention relates to a speaker enclosure and method for fabrication the same, and more particularly, to a speaker enclosure adapted for eliminating standing wave and decreasing resonance.

2. Description of Related Art

Most of the profiles of the speaker enclosures are in a shape of rectangle, square, or other geometrical shape. The internal profile of the cross-section of the inside space of the speaker enclosure is usually designed in a plane-to-plane symmetry. However, by the assistance of the continued development of the acoustic technology, the understanding for the performance of sound waves is clearer than ever. It is known that the sound waves from the speaker and the reflected sound waves in a speaker enclosure having a symmetrical plane-to-plane cross-section interact each other and further generates standing waves.

In the view of wave transmission, the so-called standing wave is the combined wave of two waves of opposite moving direction superimpose to each other when wave from the opposite side transmits on the same horizontal line. In most prior speaker enclosures, such as a square speaker enclosure, the 6 surfaces included inside the speaker enclosure (i.e. the upside surface, the bottom side surface, the left-side surface, the right side surface, the front side surface, and the back side surface) are parallel to each other. Hence, some standing waves described following may happen: Axial Standing Wave resulting from two corresponding surfaces, Tangential Standing Wave resulting from four corresponding surfaces, and Oblique Standing Wave resulting from six corresponding surfaces. Each of them affects the quality and the clarity of sound waves from the speaker enclosure. In addition, mechanical vibration of the speaker enclosure owing to the overpowered amplitude of sound emitted from a speaker, may also affect the quality of sound. In order to avoid these situations and to match the demand of the speaker system, manufacturers have to select specific thickness of housing of the speaker enclosure to avoid mechanical vibration, and choose the material with high density and high uniformity to enhance the quality of sound waves. For example, the material used in the high price speaker enclosure of speaker system on the market is usually logs. However, the price is expensive, and is not easy for all the consumers to afford it.

SUMMARY OF THE INVENTION

An object of the present invention is to provide a speaker enclosure, having an irregular inner surface, which can attenuate sound waves reflected from the surface in the speaker enclosure, so that the standing waves could be decreased and the fidelity could be increased.

To achieve the above object, the present invention provides a speaker enclosure, comprising: a main housing, a top cover, and a bottom plate. The main housing, fabricated by a molding process, have a continuous side wall, end faces, and an inner space, wherein the continuous side wall with the inner space surrounded by its inner surface extends to both side respectively to form the two end faces, the inner space locates between the two end faces and the continuous side wall, and at least a speaker mounting hole for disposing a speaker unit locates on the inner surface; a top cover is arranged to connect with an end face of the main housing; and a bottom plate is arranged to connect with another end face of the main housing; wherein, a plurality of ribs are formed on the inner surface of the continuous side wall, so that the inner surface is an irregular surface.

Accordingly, the reflected direction of sound waves generated by a speaker unit in the inner space will be changed, and the amplitude of sound waves will be decreased by an irregular surface formed in the inner surface of the continuous side wall. As the result, standing waves and echoes mixing with original sound waves may be eliminated.

In a speaker enclosure of the present invention, each rib may optionally include a protrusion which is perpendicular to the two end faces.

Further, each rib may preferably include the protrusion provided with a transverse section selected from a group consisting of a shape of pyramid, circle, circular cone, square, trapezoid, polygon, and the rest of non-geometry thereof. Besides, the transverse section of the protrusions in each rib can be the same or different. Preferably, there is also a recession between each protrusion of the rib, forming an irregular inner surface composed of two continuous and alternate portions, the protrusion and the recession. Because the continuous side wall is provided with irregular shapes and heights, when sound waves enter the inner surface, these structures may reduce the forming possibility of standing waves and the amplitude of reflected sound waves by means of distributed reflection and diffraction resulting from the irregular surface.

In a speaker enclosure of the present invention, the inner space formed in the inner surface of the continuous side wall may have a longitudinal section selected from a group consisting of a shape of rectangle, parallelogram, circle, ellipse, and trapezoid.

In a speaker enclosure of the present invention, the top cover may be a flat plate, a cover having a curved surface, a hollow cover having an inclined top surface, or a solid cover having an inclined top surface.

Moreover, the continuous side wall may include two side walls, a front side wall, and a back side wall, the back side wall and the front side wall are connected with the two side walls respectively, and at least a speaker mounting hole is arranged on the front side wall.

In a speaker enclosure of the present invention, the molding process may be an inject molding, a compression molding, or an extrusion molding. Preferably, the main housing is formed integrally by extrusion molding. Thus, that may reduce the process of fabricating speaker enclosure and lower the cost effectively.

In a speaker enclosure of the present invention, the material of the main housing is selected from a group consisting of polyvinylchloride (PVC), polypropylene (PP), polyethylene (PE), acrylonitrile butadiene styrene (ABS), nylon, wood-plastic composites (WPC), polybutylene terephthalate (PBT), polyester (PET), polycarbonate (PC), polyethylene terephthalate (PET), and the combinations thereof. Further, preferably, the material density of main housing is between 0.9 to 2.0 g/cm$^3$. More preferably, the material density of main housing is between 1.2 to 2.0 g/cm$^3$. As such, the material having better uniformity and high density may reduce the occurrence of non-uniform sound waves, the material having high density may reduce thickness of the speaker enclosure, and the material also provide stable firmness to avoid mechanical vibration.

In a speaker enclosure of the present invention, the main housing may be provided with a plurality of holes, which penetrates through the two end faces and the continuous side wall. Further, each hole comprises a transverse section selected from a group consisting of a shape of square, rectangle, circle, ellipse, polygon, pyramid, circular cone, trapezoid, and the rest of non-geometry thereof. Therefore, each hole may be filled in a damping material. Besides, the damping material may be selected from a group consisting of air, iron sand, rubber, plastic, resin, cement, non-ferrous metal, and plant fiber composite material.

In a speaker enclosure of the present invention, the bottom plate may be arranged a vent hole, or a plurality of vent holes.

In a speaker enclosure of the present invention, the inner surface of the continuous side wall is further arranged a sound-absorbing unit. Further, the sound-absorbing unit may be glass cotton, asbestos, acetate fiber, nylon fiber, synthetic fiber, or any combination thereof.

Another embodiment of the present invention provides a method for fabricating a speaker enclosure, comprising: forming a main housing having a continuous side wall, end faces, and an inner space by a molding process, wherein the continuous side wall with the inner space surrounded by its inner surface extends to both side respectively to form the two end faces, the inner space locates between the two end faces and the continuous side wall, and a plurality of ribs are formed on the inner surface of the continuous side wall, so that the inner surface is an irregular surface; arranging at least one speaker mounting hole on the continuous side wall for disposing a speaker unit, arranging a top cover to connect with an end face of the main housing, and locating the speaker unit in the inner space; and arranging a bottom plate to connect with another end face of the main housing.

Therefore, the speaker enclosure formed by the fabricating method of the present invention, the reflected direction of sound waves generated by a speaker unit in the inner space will be changed, and the amplitude of sound waves will be decreased by an irregular surface formed in the inner surface of the continuous side wall. As the result, standing waves and echoes mixing with original sound waves may be eliminated.

In a fabricating method of the speaker enclosure of the present invention, the molding process may be an inject molding, a compression molding, or an extrusion molding. Further, the main housing is formed integrally by extrusion molding.

In a fabricating method of the speaker enclosure of the present invention, each rib may include the protrusion provided with a transverse section, which is selected from a group consisting of a shape of pyramid, circle, circular cone, square, trapezoid, polygon, and the rest of non-geometry thereof. Besides, the transverse section of the protrusions in each rib can be the same or different. There is also a recession between each protrusion of the rib, forming an irregular inner surface composed of two continuous and alternate portions, the protrusion and the recession. Because the continuous side wall is provided with irregular shapes and heights, when sound waves enter the inner surface, these structures may reduce the forming possibility of standing waves and the amplitude of reflected sound waves by means of distributed reflection and diffraction resulting from the irregular surface.

In a fabricating method of the speaker enclosure of the present invention, the main housing may be provided with a plurality of holes, which penetrates through the two end faces and the continuous side wall. Further, each hole comprises a transverse section selected from a group consisting of a shape of square, rectangle, circle, ellipse, polygon, pyramid, circular cone, trapezoid, and the rest of non-geometry thereof. Therefore, each hole may be filled in a damping material. Besides, the damping material may be selected from a group consisting of air, iron sand, rubber, plastic, resin, cement, non-ferrous metal, and plant fiber composite material.

DETAILED DESCRIPTION OF THE PREFERRED EMBODIMENT

Figure 1:
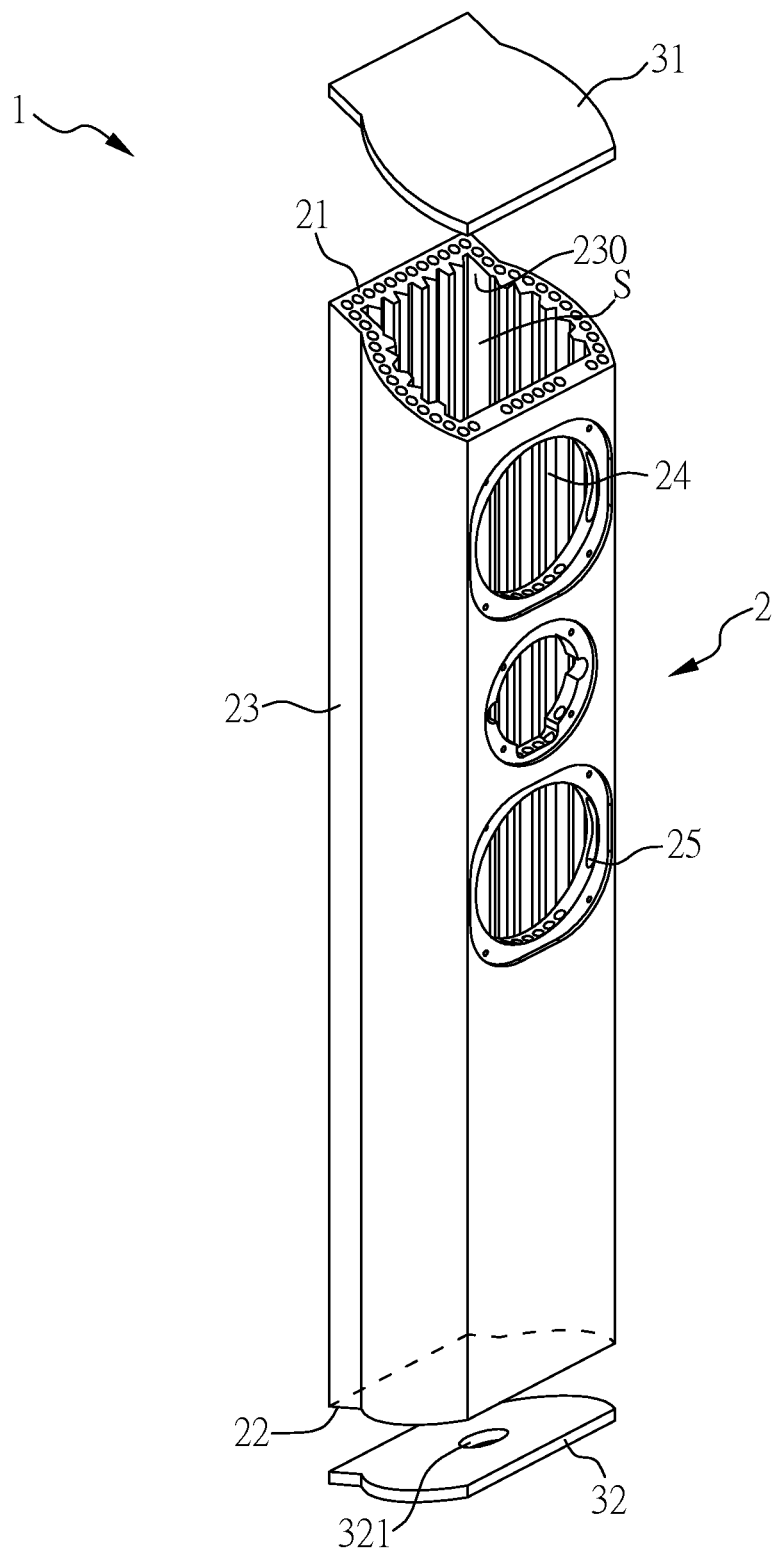
FIG. 1 is an exploded view of a speaker enclosure according to the preferred embodiment of the present invention.
Figure 2:
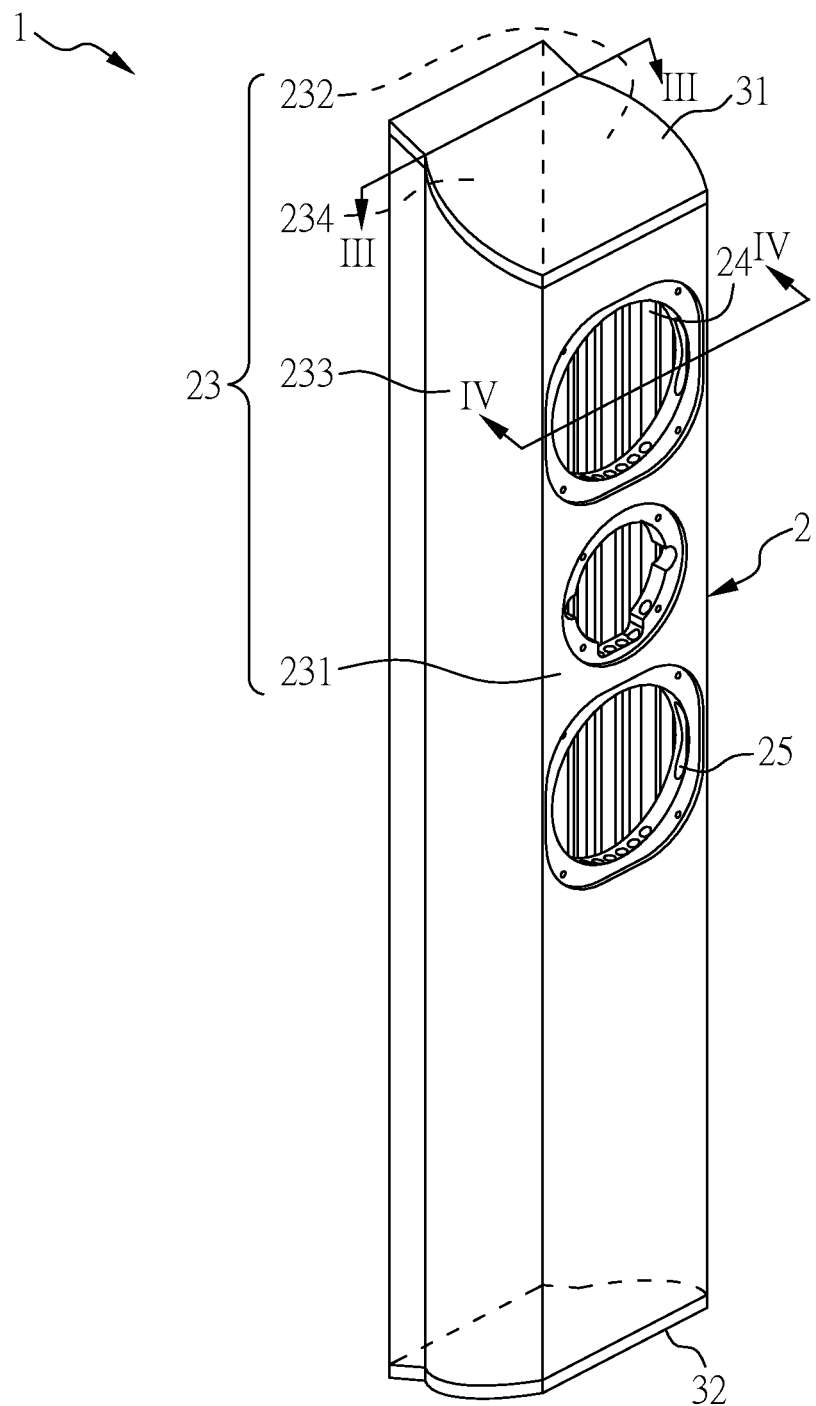
FIG. 2 is a schematic diagram of a speaker enclosure according to the preferred embodiment of the present invention.

Referring to FIG. 1 and FIG. 2, which is an exploded view and a schematic diagram of a speaker enclosure respectively according to the preferred embodiment of the present invention. As shown in FIG. 1 and FIG. 2, a speaker enclosure 1 comprising: a main housing 2, a top cover, and a bottom plate. A main housing 2, fabricated by a molding process, comprises an inner space S, a first end face 21, a second end face 22, and a continuous side wall 23. The side wall 23 extends to both side respectively to form the first end face 21 and the second end face 22, and three speaker mounting holes locates on the continuous side wall 23. Each speaker mounting hole 25 contains a speaker unit 4. An inner surface 230 of the continuous side wall 23 forms an inner space S. A top cover 31 is arranged to connect with the first end face 21 of the main housing 2; a bottom plate 32 is arranged to connect with the second end face 22 of the main housing 2, and a vent hole 321 is arranged thereon. Therefore, when three speaker units 4 are operated, air displacement in speaker enclosure 1 will be transported through the vent hole 321 and helps three speaker units 4 to push more air volume, so that it makes better effect of audio frequency extension. Moreover, a plurality of ribs 24 are arranged and formed on the inner surface 230 of the continuous side wall 23, so that the inner surface 230 is an irregular surface.

As shown in FIG. 2 and referring to FIG. 1 at the same time, the continuous side wall 23 of the main housing 2 includes two side walls 232, 233, a front side wall 231, and a back side wall 234. The back side wall 234 and the front side wall 231 are connected with the two side walls 232, 233 respectively. Three speaker mounting holes 25 locate on the front side wall 231, and penetrate through inner space S. Therefore, the speaker enclosure 1, with three speaker mounting holes 25 for accommodating three speaker units 4 in the front side wall 231, can be a speaker system making sound pass through the front side. The speaker system described above and the testing content of frequency response will be illustrated in FIG. 5 and FIG. 7.

Furthermore, the material of main housing 2, top cover 31, and bottom plate 32 can be selected from a group consisting of polyvinylchloride (PVC), polypropylene (PP), polyethylene (PE), acrylonitrile butadiene styrene (ABS), nylon, wood-plastic composites (WPC), polybutylene terephthalate (PBT), polyester (PET), polycarbonate (PC), polyethylene terephthalate (PET), and the combinations thereof. Preferably, the material density of main housing 2, top cover 31, and bottom plate 32 may be between 0.9~2.0 g/cm$^3$. In the present embodiment, the material of main housing 2, top cover 31, and bottom plate 32 are the modified composite polypropylene, whose density is between 0.9~2.0 g/cm$^3$. As such, the material having better density uniformity and high density may reduce the occurrence of non-uniform sound waves, the material having high density can reduce thickness of the speaker enclosure 1, and the material also provide stable firmness to avoid mechanical vibration.

Accordingly, in the inner space S of the speaker units 4, the reflected direction of sound waves will be changed and the amplitude of sound waves will be decreased by an irregular surface formed in the inner surface 230 of the continuous side wall 23. As the result, the situation such as standing waves and echoes mixing with original sound waves may be eliminated.

Figure 3:
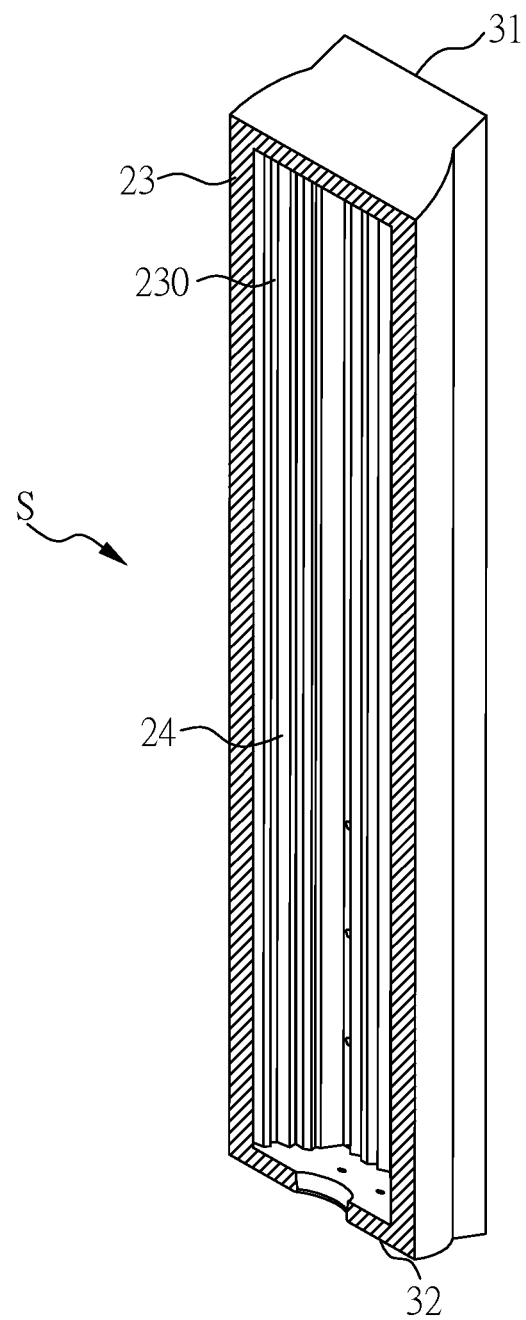
FIG. 3 is a longitudinal section view of a speaker enclosure along line III-III shown in FIG. 2.
Figure 4:
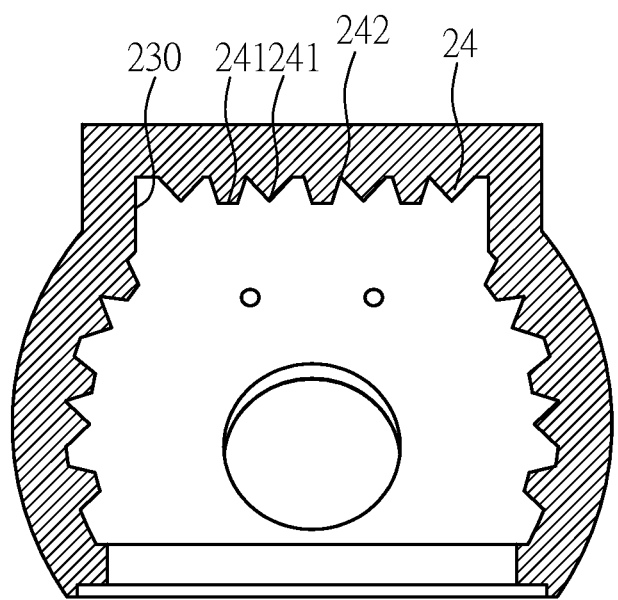
FIG. 4 is a transverse section view of a speaker enclosure along line III-III shown in FIG. 2.

For the sake of describing the design of the present invention more accurately, please refer to FIG. 3 and FIG. 4, which are a longitudinal section view and a transverse section view of a speaker enclosure 1 along line III-III shown in FIG. 2 respectively. As shown in FIG. 3, the inner space S formed in the inner surface 230 of the continuous side wall 23 is provided with a longitudinal section which can be a rectangle, a parallelogram, a circle, an ellipse, or a trapezoid. In the present embodiment, the longitudinal section of the inner space S is a parallel trapezoid so that the height and the width of the continuous side wall 23 of the main housing 2 will be different. In addition, both of their length ratios are not an integral, which can avoid the increasing possibility of the overlapping of plenty of the same resonance frequency in the speaker enclosure when the ratio of width and height is an integral. As such, energy may not increase because the combinations of plenty of the same resonance frequencies will be decreased, and the possibility of generation of subsequent standing waves will be decreased, too. As shown in FIG. 1 and FIG. 2, in this design of the longitudinal section, the first end face 21, and the second end face 22 are provided with a tilt angle corresponding to the longitudinal central axis of the main housing 2, so that the top cover 31 and the bottom plate 32 with the same tilt angle and without parallel arrangement contact respectively to the first end face 21 and the second end face 22. The top cover 31 and the bottom plate 32 can be flat plates, covers having curved surfaces, hollow covers having an inclined top surface, or solid covers having an inclined top surface respectively. In the present embodiment, the top cover 31 and the bottom plate 32 are flat plates respectively.

Referring to FIG. 4 and FIG. 3 together, each rib 24 includes a protrusion 241 which is perpendicular to the first end face 21 and the second end face 22, wherein the protrusion 241 is provided with a transverse section selected from a group consisting of a shape of pyramid, circle, circular cone, square, trapezoid, polygon, and the rest of non-geometry thereof. The transverse section of the protrusions 241 in each rib 24 can be the same or different. There is also a recession 242 between each protrusion 241 of the rib 24, forming an irregular inner surface 230 composed of two continuous and alternate portions, the protrusion 241 and the recession 242. Because continuous side wall 23 is provided with irregular shapes and heights, when sound waves enter the inner surface 230, these structures may reduce the forming possibility of standing waves and the amplitude of reflected sound waves by means of distributed reflection and diffraction resulting from the irregular surface.

In summary, in the inner space S of the speaker units 4, the reflected direction of sound waves will be changed and the amplitude of sound waves will be decreased by an irregular surface formed in the inner surface 230 of the continuous side wall 23 and the length-breadth ratio of non-integral multiple of the inner space S. As the result, the situation such as standing wave and echoes mixing with original sound waves may be eliminated.

Furthermore, the present embodiment also provides a method for fabricating a speaker enclosure 1. Referring to FIG. 1 and FIG. 2, comprising: a main housing, formed by a molding process, includes a first end face 21, a second end face 22, a continuous side wall 23, and an inner space S. The continuous side wall 23 with the inner space S on its inner surface 230 extends to both side respectively to form the first end face 21 and the second end face 22, wherein a plurality of ribs 24 are formed on the inner surface 230 of the continuous side wall 23, so that the inner surface 230 is an irregular surface; arranging three speaker mounting holes 25 on the continuous side wall 23 for disposing a speaker unit 4; arranging a top cover 31 to connect with an end face 21 of the main housing 2; and arranging a bottom plate 32 to connect with another end face 22 of the main housing 2.

In the present embodiment, the main housing 2 is made by extrusion molding, wherein the material of main housing 2 is modified composite of resin. In the present embodiment, the material of main housing 2 is modified composite polypropylene, including polypropylene in the range of parts per hundred of resin 40~65 Phr, inorganic powder in the range of parts per hundred of resin 15~35 Phr, and additive in the range of parts per hundred of resin 1~5 Phr. The inorganic powder can be calcium carbonate, mica, barium sulfate, aluminum hydroxide, or magnesium hydroxide; also, additive can be zinc stearate or antioxidants. Further, before fabricating the main housing 2 through extrusion molding method, polypropylene, inorganic powder, and antioxidants may do the blending process by using a single-axle or dual-axles screw extrusion molding machine in order to produce particles of modified composite polypropylene with uniform mixing. In the present invention, polypropylene, inorganic powder and additive do the blending process by using the dual-axles screw extrusion molding machine. Range of the environmental temperature of melting formation is between 150° C. and 300° C., and screw rotational speed of the single-axles screw extrusion molding machine is in the range of 50 to 350 rpm (revolution per minute). After extruding, particles of modified composite polypropylene with uniform mixing will be created by granule manufacture method, such as strand die.

Accordingly, particles of modified composite polypropylene with uniform mixing is located in the single-axles screw extrusion molding machine having a model design of the main housing 2, doing the extrusion molding. Wherein, Range of the environmental temperature of melting formation is between 150° C. and 300° C., and screw rotational speed of the single-axles screw extrusion molding machine is in the range of 50 to 350 rpm (revolution per minute). By using the single-axles screw extrusion molding machine of the model design of the main housing 2 to do the extrusion molding and produce the main housing 2. Then, placing a shaping mold and a cooling tank (or cooling by air flow directly) to get the shape and cooling temperature, and at the end using a feeding machine to move out the main housing 2 and using a cutting machine to cut the dimension we need. This process will complete the finished product of the main housing 2. Therefore, in the present embodiment, the main housing 2 is formed integrally in order to reduce the process of fabricating speaker enclosure and lower the cost effectively.

Referring to FIG. 3 and FIG. 4, in the present embodiment, the speaker enclosure 1 by using the fabricating method that mentioned above, each rib 24 includes a protrusion 241 which is perpendicular to the first end face 21 and the second end face 22, wherein the protrusion 241 is provided with a transverse section selected from a group consisting of a shape of pyramid, circle, circular cone, square, trapezoid, polygon, and the rest of non-geometry thereof. The transverse section of the protrusions 241 in each rib 24 can be the same or different. There is also a recession 242 between each protrusion 241 of the rib 24, forming an irregular inner surface 230 composed of two continuous and alternate portions, the protrusion 241 and the recession 242. Because continuous side wall 23 is provided with irregular shapes and heights, when sound waves enter the inner surface 230, these structures may reduce the forming possibility of standing waves and the amplitude of reflected sound waves by means of distributed reflection and diffraction resulting from the irregular surface. Furthermore, the main housing 2 also has a plurality of holes so that the plurality of holes pass through the first end face 21, the second end face 22 and the continuous side wall 23.

In summary, the present invention provides a simplified, and low cost fabricating method of speaker enclosure, and a main housing 2 integrally produced by extrusion molding. Moreover, in the inner space S of the speaker units 4, the reflected direction of sound waves will be changed and the amplitude of sound waves will be decreased by an irregular surface formed in the inner surface 230 of the continuous side wall 23 and the length-width ratio of non-integral multiple of the inner space S. As the result, the situation such as standing wave and mixing sound which combines echoes and original sound waves may be eliminated, and further produces a high quality speaker enclosure.

Figure 5:
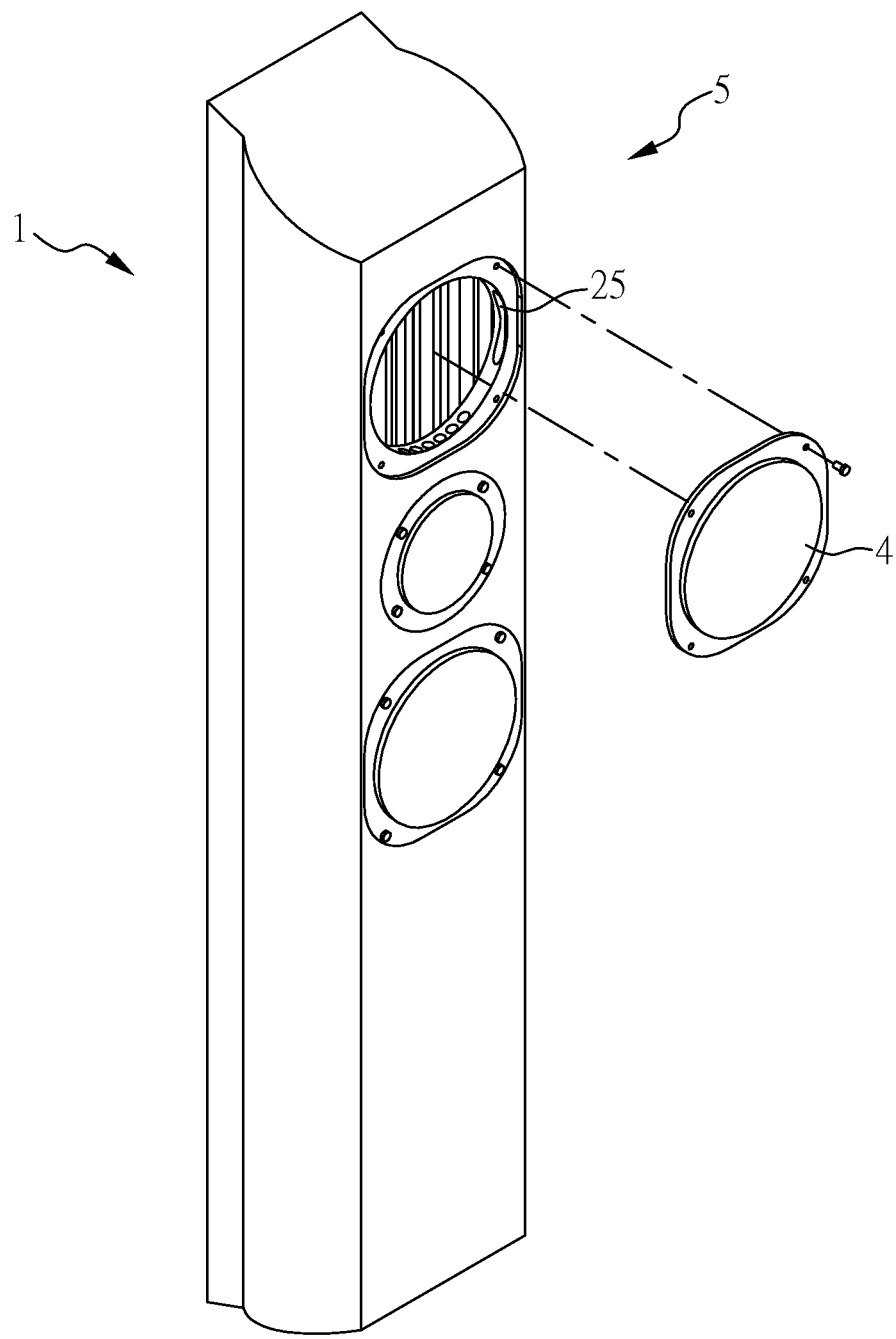
FIG. 5 is a schematic diagram of a speaker system according to the preferred embodiment of the present invention.

Referring to FIG. 5, which is a schematic diagram of a speaker system according to the preferred embodiment of the present invention, please refer to FIG. 1 to FIG. 4 at the same time. As shown in FIG. 5, a speaker system 5 is formed by three speaker units 4 on the three speaker holes 25 of the front side wall 231 of the speaker enclosure 1, wherein three speaker units 4 is divided into high frequency, intermediate frequency, and low frequency speaker units 4. Range for low frequency is between 5 to 20 kHz, range for intermediate frequency is between 150 to 5000 Hz, and range for high frequency is between 5 to 2000 Hz.

Figure 6:
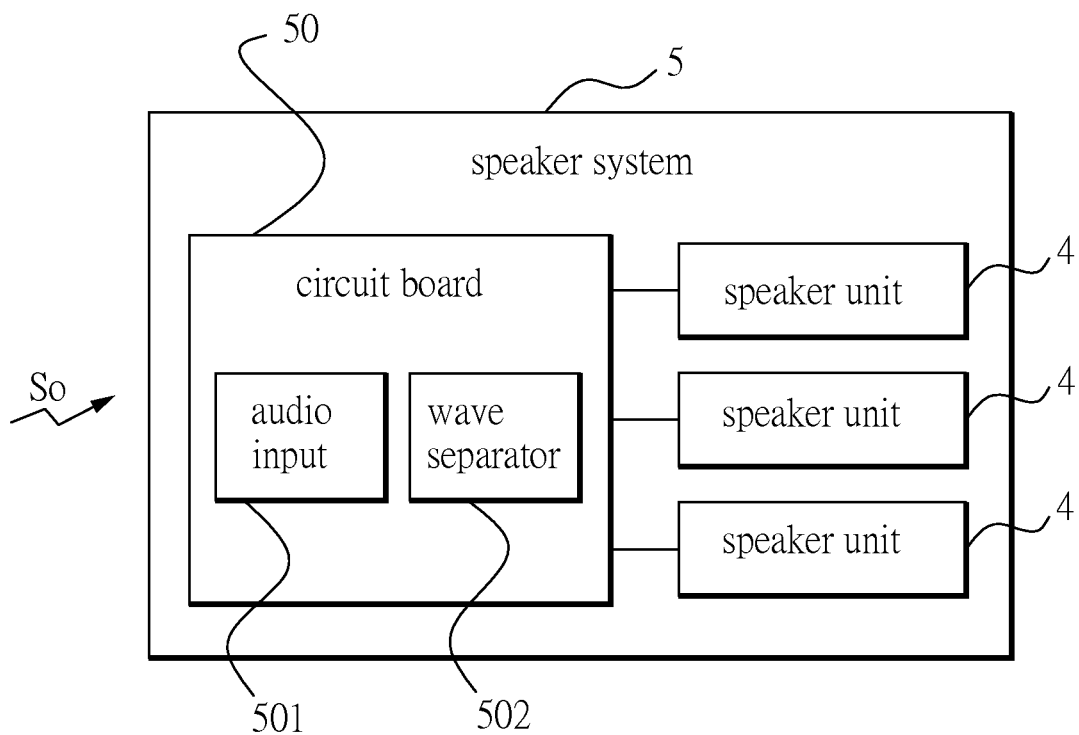
FIG. 6 is a block diagram of a speaker system according to the preferred embodiment of the present invention.

Referring to FIG. 6, which is a block diagram of a speaker system according to the preferred embodiment of the present invention. When an audio signal SO enters a audio input 501 of a circuit board 50 of the speaker system 5, a wave separator 502 of the circuit board 50 connected to three speaker units 4 may deliver sound waves to three speaker units 4 according to audio signal.

Figure 7:
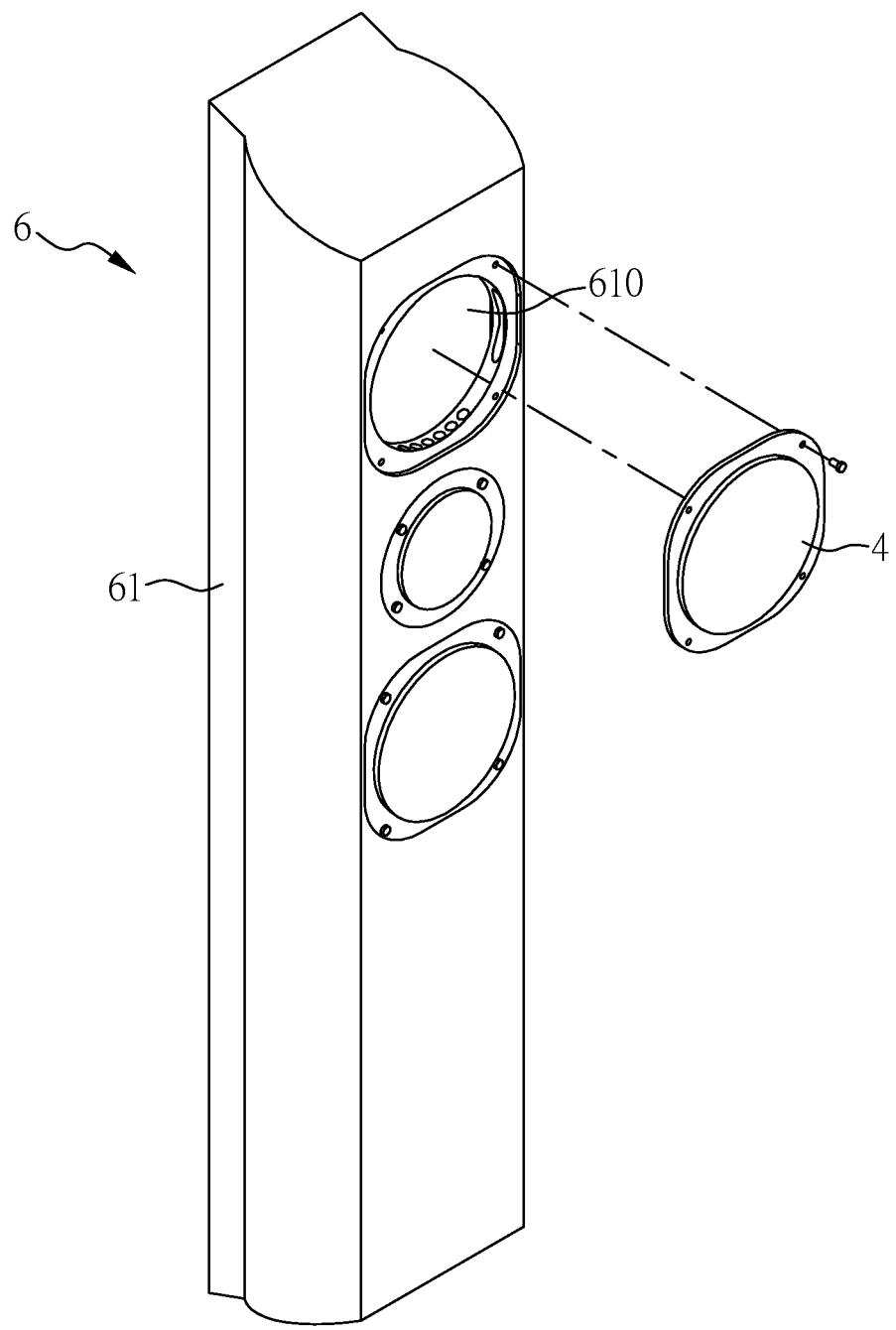
FIG. 7 is a schematic diagram of a speaker system according to a comparison example.

Referring to FIG. 7, which is a schematic diagram of a speaker system according to a comparison example. As shown in FIG. 7, the previously described speaker system 6 and the speaker system 5 of present embodiment shown in FIG. 5 are roughly the same, both of which arrange the same three speaker units 4. The only difference is that an inner surface 610 of a continuous side wall 61 located on the speaker system 6 is a smooth surface.

Figure 8:
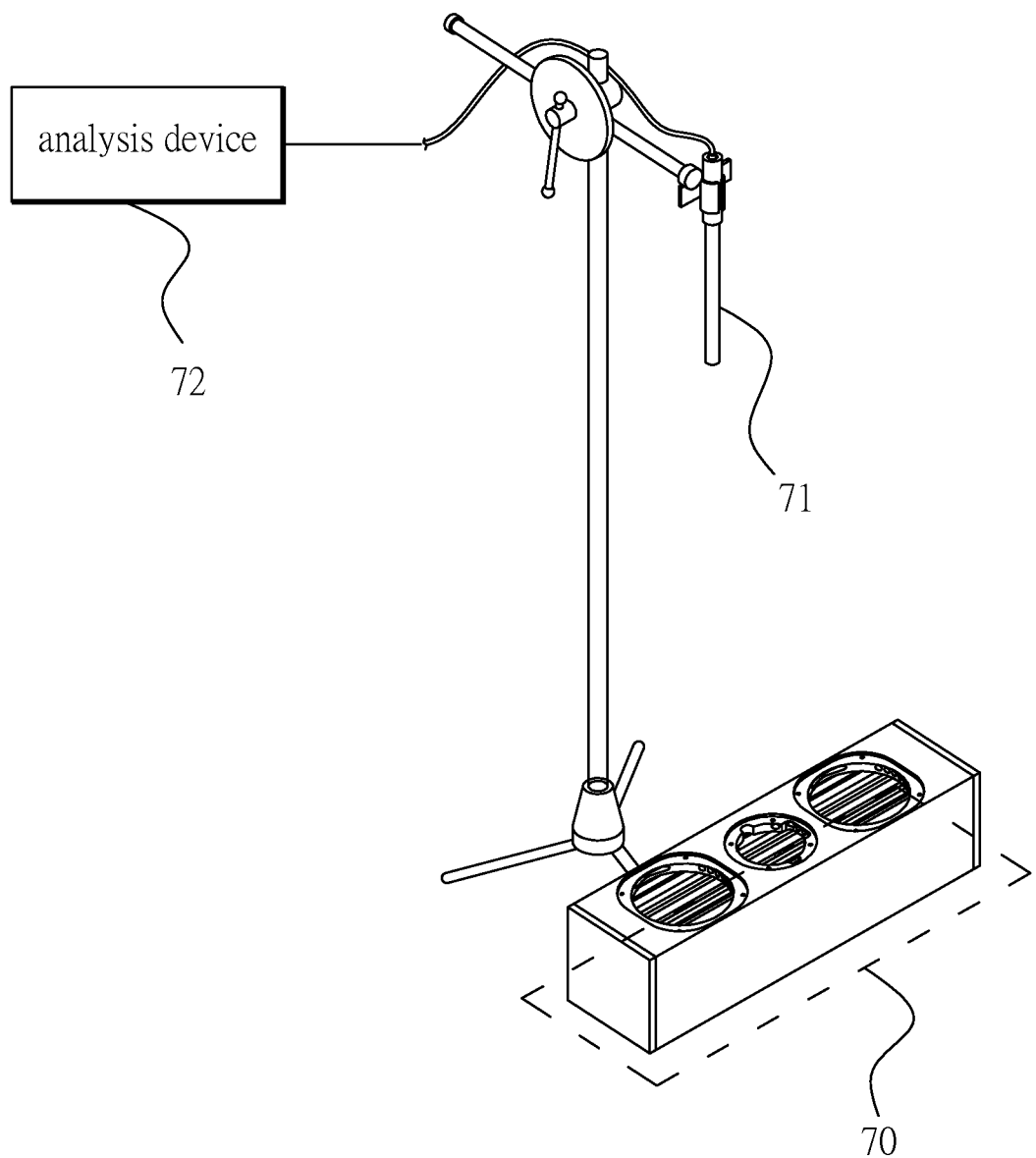
FIG. 8 is a schematic diagram of a speaker system testing position according to the present invention.

However, if only change for smooth surface or only irregular surface is applied between these two faces, the effect for reducing the standing wave is limited. Thus, the inventor takes the initiative to do the system testing between the preferred embodiment and the comparison example. Referring to FIG. 8, which is a schematic diagram of a speaker system testing position according to the present invention. As shown in FIG. 8, different speaker systems may be located in the same measured position 70 while testing, detecting the sound waves of the speaker system located thereon by using a reception device 71, and analyzing frequency response of the sound waves by an analysis device 72 connected to a reception device. Further, the reception device 71 may be a microphone, and the analysis device 72 may be a calculator having frequency response analysis software.

Therefore, the speaker system 5 of the preferred embodiment of the present invention and the speaker system 6 of the comparison example can emit sound waves respectively according to the same audio signal. Then, the audio signal received by the reception device 71, and analyzed by the analysis device 72 to tell the difference of the frequency response between two speaker systems 5, 6.

Figure 9:
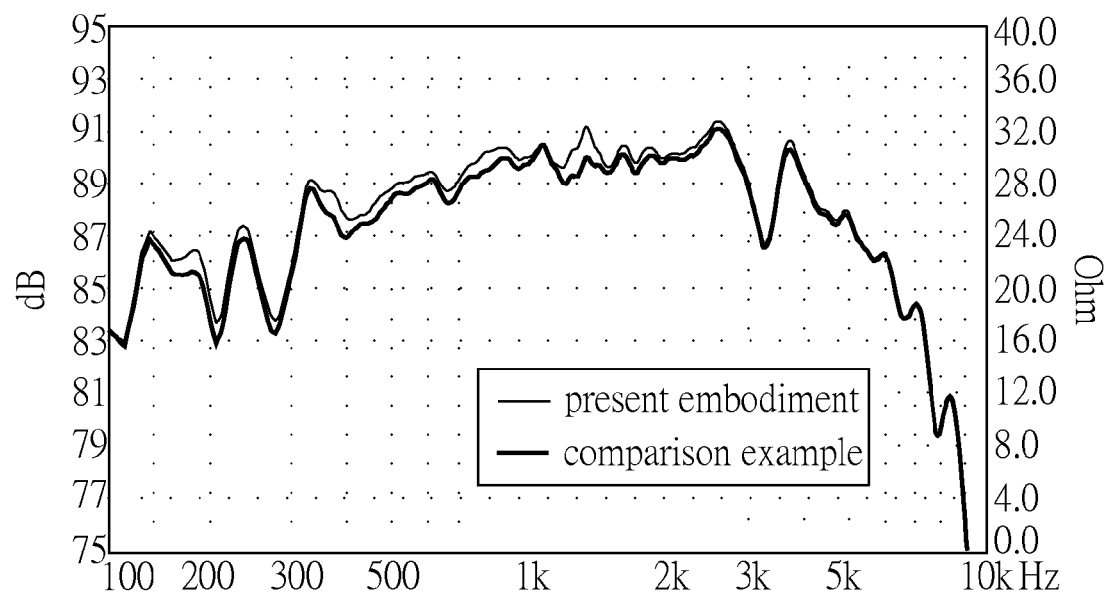
FIG. 9 is a schematic diagram of frequency response of a speaker system according to the preferred embodiment and the comparison example of the present invention.

Referring to FIG. 9, FIG. 9 is a schematic diagram of frequency response of a speaker system according to the preferred embodiment and the comparison example of the present invention. Please also refer to FIG. 5, FIG. 7 and FIG. 8 at the same time. As shown in FIG. 9, in the range of 0 Hz to 10000 Hz, the speaker system 5 (preferred embodiment) apparently is much clearer and more powerful in frequency response of intermediate frequency portion than the speaker system 6 (comparison example). The frequency response shown in the speaker system 6 should be clearly seen according to lots of irregular and non-smooth wave peak in the range of intermediate frequency, which means the inner surface 610 of the speaker system 6 is a smooth surface that is more effective to eliminate the standing waves in the range of high-intermediate frequency (see 5000 Hz to 10000 Hz in FIG. 9), while tit just has limited effect to eliminate the standing waves in the range of low-intermediate frequency. On the other hand, speaker system 5 of the preferred embodiment of the present invention is provided with a protrusion 241 and a recession 242 which are perpendicular to a first end face 21 and second end face 22 formed by the plurality of ribs 24 of the inner surface 230 of the continuous side wall 23 of the main housing 2. As such, when sound waves are transmitted from the inner space S which the speaker enclosure of the speaker system 5 is provided with to the inner surface 230, not only the reflection direction changes, but also dispersive reflection generates while sound waves arrive top of the protrusion 241 and generate diffraction while sound waves arrive on bottom of the recession 242. Amplitude of the reflection and diffraction may decrease because of the reason mentioned above. As the result, the speaker system 5 may decrease these situations effectively such as standing waves and echoes mixing with original sound waves may be eliminated.

Figure 10:
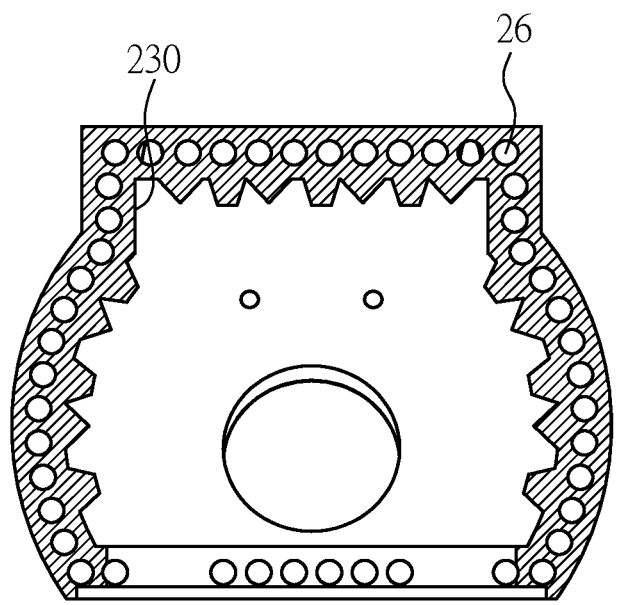
FIG. 10 is a transverse section view of a speaker enclosure according to alternate preferred embodiment of the present invention.

Referring to FIG. 10, which is a transverse section view of a speaker enclosure according to alternate preferred embodiment of the present invention. Please also refer to FIG. 1 and FIG. 2 at the same time. As shown in FIG. 10, the previously described speaker enclosure and the preferred embodiment of the present invention shown in FIG. 4 are roughly the same.

The only difference is that a plurality of holes 60 is arranged on the main housing 2, passing through the first end face 21, the second end face 22, and the continuous side wall 23. In the present invention, the transverse section of each hole 26 is a circle. In addition, in the present invention, the main housing 2 and the plurality of holes 26 disposed on the main housing 2 are made by using extrusion molding and produced integrally without any extra fabricating method.

Further, each hole 26 is filled in a damping material, which selected from a group consisting of air, iron sand, rubber, plastic, and resin. In the present embodiment the damping material is air. Therefore, the holes can decrease the amplitude of the return wave passing through the speaker enclosure, and decrease the solid mechanical vibration transferring to heat release. Moreover, in the present embodiment, the inner surface 230 of the continuous side wall 23 further comprises a sound-absorbing unit, which can be glass cotton, asbestos, acetate fiber, nylon fiber, synthetic fiber, or the combinations thereof. It is really effective for a speaker enclosure to reduce the conditions of standing waves and reflection receiving high-intermediate sound waves.

Figure 11:
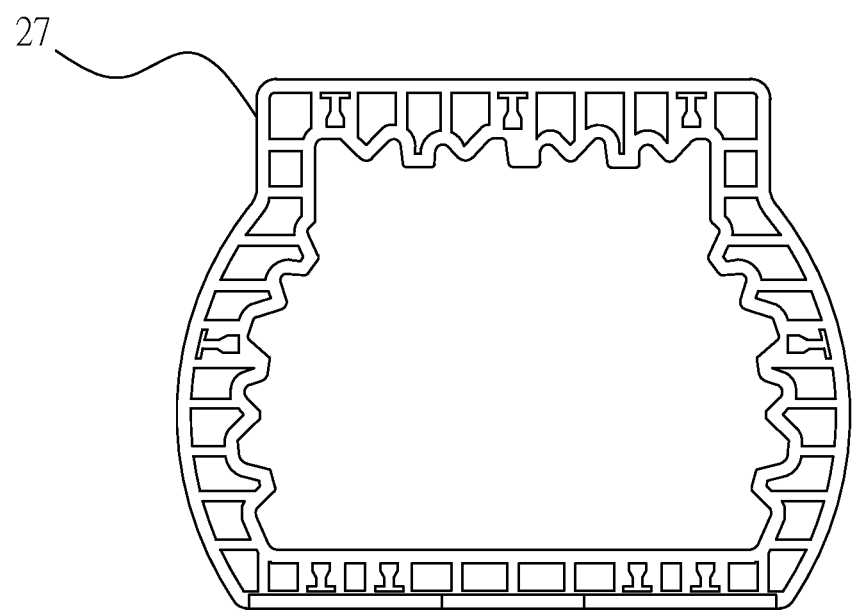
FIG. 11 is a transverse section view of a speaker enclosure according to another alternate preferred embodiment of the present invention.

In addition, a transverse section of each hole is selected from a group consisting of a shape of square, rectangle, circle, ellipse, polygon, pyramid, circular cone, trapezoid, and the rest of non-geometry thereof. Referring to FIG. 11, which is a transverse section view of a speaker enclosure according to another alternate preferred embodiment of the present invention. Please also refer to FIG. 1 and FIG. 2 at the same time. As shown in FIG. 10, the previously described speaker enclosure and the preferred embodiment of the present invention shown in FIG. 4 are roughly the same. The only different place is that a plurality of holes 26 are arranged on the main housing 2, and a plurality of holes 27 pass through the first end face 21, the second end face 22, and the continuous side wall 23, wherein the plurality of holes 27 are composed of different non-geometry cross-section of holes.

Although the present invention has been explained in relation to its preferred embodiment, it is to be understood that many other possible modifications and variations can be made without departing from the spirit and scope of the invention as hereinafter claimed.

What is claimed is:

1. A speaker enclosure, comprising:
   a main housing fabricated by an extrusion molding process, formed integrally and having a continuous side wall, end faces, and an inner space, wherein the continuous side wall with the inner space surrounded by an inner surface of the continuous side wall extends to both sides respectively to form the two end faces, the inner space located between the two end faces and the continuous side wall, and at least a speaker mounting hole for disposing a speaker unit located on the inner surface;
   a top cover arranged to connect with an end face of the main housing; and
   a bottom plate arranged to connect with another end face of the main housing;
   wherein, a plurality of ribs are formed on the inner surface of the continuous side wall, so that the inner surface is an irregular surface.

2. The speaker enclosure as claimed in claim 1, wherein each rib comprises a protrusion which is perpendicular to the two end faces.

3. The speaker enclosure as claimed in claim 2, wherein each rib comprises a protrusion with a transverse section selected from a group consisting of a shape of pyramid, circle, circular cone, square, trapezoid, polygon, and the rest of non-geometry thereof.

4. The speaker enclosure as claimed in claim 1, wherein the inner space formed in the inner surface of the continuous side wall has a longitudinal section selected from a group consisting of a shape of rectangle, parallelogram, circle, ellipse, and trapezoid.

5. The speaker enclosure as claimed in claim 1, wherein the top cover is a flat plate, a cover having a curved surface, a hollow cover having an inclined top surface, or a solid cover having an inclined top surface.

6. The speaker enclosure as claimed in claim 1, wherein the continuous side wall comprises two side walls, a front side wall, and a back side wall, the back side wall and the front side wall are connected with the two side walls respectively, and at least a speaker mounting hole is arranged on the front side wall.

7. The speaker enclosure as claimed in claim 1, wherein the material of the main housing is selected from a group consisting of polyvinylchloride(PVC), polypropylene(PP), polyethylene(PE), acryloni-trile butadiene styrene(ABS), nylon, wood-plastic composites(WPC), polybutylene terephthalate (PBT), polyester(PET), polycarbonate(PC), polyethylene terephthalate(PET), and the combinations thereof.

8. The speaker enclosure as claimed in claim 1, wherein the main housing is provided with a plurality of holes, which penetrates through the two end faces and the continuous side wall.

9. The speaker enclosure as claimed in claim 8, wherein each hole comprises a transverse section selected from a group consisting of a shape of square, rectangle, circle, ellipse, polygon, pyramid, circular cone, trapezoid, and the rest of non-geometry thereof.

10. The speaker enclosure as claimed in claim 8, wherein each hole is filled in a damping material.

11. The speaker enclosure as claimed in claim 10, wherein the damping material is selected from a group consisting of air, iron sand, rubber, plastic, resin, cement, non-ferrous metal, and plant fiber composite material.

12. The speaker enclosure as claimed in claim 1, wherein the bottom plate is arranged a vent hole, or a plurality of vent holes.

13. The speaker enclosure as claimed in claim 1, wherein the inner surface of the continuous side wall is further arranged a sound-absorbing unit.

14. The speaker enclosure as claimed in claim 13, wherein the sound-absorbing unit is glass cotton, asbestos, acetate fiber, nylon fiber, synthetic fiber, or any combination thereof.

15. A method for fabricating a speaker enclosure, comprising:
   forming a main housing integrally having a continuous side wall, end faces, and an inner space by an extrusion molding process, wherein the continuous side wall with the inner space surrounded by an inner surface of the continuous side wall extends to both sides respectively to form the two end faces, the inner space located between the two end faces and the continuous side wall, and a plurality of ribs are formed on the inner surface of the continuous side wall, so that the inner surface is an irregular surface;
   arranging at least one speaker mounting hole on the continuous side wall for disposing a speaker unit, arranging a top cover to connect with an end face of the main housing, and locating the speaker unit in the inner space; and
   arranging a bottom plate to connect with another end face of the main housing.

16. The fabricating method as claimed in claim 15, wherein each rib comprises a protrusion which is perpendicular to the two end faces.

17. The fabricating method as claimed in claim 15, wherein each rib comprises a protrusion with a transverse section selected from a group consisting of a shape of pyramid, circle, circular cone, square, trapezoid, polygon, and the rest of non-geometry thereof.

18. The fabricating method as claimed in claim 15, wherein the main housing is provided with a plurality of holes, which penetrates through the two end faces and the continuous side wall.

\* \* \* \* \*